(12) United States Patent
Morris et al.

(10) Patent No.: US 6,240,806 B1
(45) Date of Patent: Jun. 5, 2001

(54) CAM SHAFT SUPPORT AND ENCLOSURE ASSEMBLY

(75) Inventors: Brian Richard Morris, Uniontown; Jay Dudley White, Massillon, both of OH (US)

(73) Assignee: The Boler Company, Itasca, IL (US)

( * ) Notice: Subject to any disclaimer, the term of this patent is extended or adjusted under 35 U.S.C. 154(b) by 0 days.

(21) Appl. No.: 09/391,977

(22) Filed: Sep. 8, 1999

(51) Int. Cl.$^7$ ................................................. F16D 65/22
(52) U.S. Cl. ......................... 74/567; 188/329; 188/205 R
(58) Field of Search ............... 74/567; 188/326, 188/329, 330, 332, 338, 339, 205 R

(56) References Cited

U.S. PATENT DOCUMENTS

| | | | |
|---|---|---|---|
| 3,076,531 | * 2/1963 | Hanley et al. | 188/205 R |
| 3,279,569 | 10/1966 | Kieser et al. . | |
| 3,497,037 | * 2/1970 | Deibel | 188/329 |
| 3,650,360 | * 3/1972 | King et al. | 188/330 |
| 4,200,174 | * 4/1980 | Borugian et al. | 188/329 |
| 4,476,968 | * 10/1984 | Urban et al. | 188/329 |
| 4,838,389 | 6/1989 | Mamery . | |
| 5,649,612 | * 7/1997 | Walker et al. | 188/329 |
| 5,695,025 | * 12/1997 | White | 188/78 |
| 5,887,687 | * 3/1999 | Williams | 188/330 |

FOREIGN PATENT DOCUMENTS

| | | |
|---|---|---|
| 716395 | 8/1965 | (CA) . |
| 1256811 | 7/1989 | (CA) . |

OTHER PUBLICATIONS

Page 1–28 from *1994 Euclid Industries, Inc,, "Rockwell 16 1/2 Dia. 'Q Plus' Brakes—Truck and Tractor Brake"*.

\* cited by examiner

*Primary Examiner*—Richard M. Lorence
(74) *Attorney, Agent, or Firm*—Buckingham, Doolittle & Burroughs, LLP; David P. Dureska

(57) ABSTRACT

A cam shaft support and enclosure assembly includes a tube formed with a flat on its inboard end. An outboard end of the tube is supported on a spider which in turn is mounted on an axle of a heavy duty vehicle. A bushing is mounted in each of the tube ends, and a shaft is rotatably mounted in and passes completely through the bushings and sealed and lubricated tube. An S-cam is integrally formed on an exposed outboard end of the shaft and the exposed inboard end of the shaft is formed with splines for meshingly engaging a slack adjuster of the vehicle brake system. A support plate formed with a generally D-shaped keyhole is mounted on the suspension beam, and is slip-fittingly engaged by the correspondingly shaped and sized inboard end of the tube. The weld-free keyhole connection of the tube and plate enables the plate to react rotation of the tube without the possibility of fatigue or failure of a weld. The tube-to-plate slip-fit connection further enables installation of the cam assembly on different types of axle/suspension systems, where the distance between the spider and suspension beam tube support points vary, as well as on same-type suspension assemblies without concern for differing distances between the tube support points caused by natural variations in manufacturing processes. The assembly also limits load-induced wear and contamination-induced wear to the shaft and the bushing of the assembly.

8 Claims, 6 Drawing Sheets

CAM SHAFT SUPPORT AND ENCLOSURE ASSEMBLY

BACKGROUND OF THE INVENTION

1. Field of the Invention

The invention relates to brake systems of heavy duty vehicles, and in particular to cam assemblies of the brake system. More particularly, the invention is directed to a cam shaft enclosure/support assembly which enables efficient installation of the cam assembly on various types of axle/suspension systems, and extends the life of the cam assembly.

2. Background Art

In conventional heavy duty vehicle brake systems, an S-cam is utilized to lift brake shoes against a brake drum to decelerate a vehicle. The cam shaft to which the S-cam is integrally connected typically is supported at each of its ends by a bushing or bearing. These bushings usually are greased to reduce friction between the bushings and the cam shaft.

If the bushings or the cam shaft become worn and/or rotational friction of the cam shaft against the bushings increases, the overall efficiency of the brake system decreases. Of course, when bushing or cam shaft wear exceeds predetermined limits, bushing and/or cam shaft replacement is required. Recommended practice in the industry is that when the cam shaft and/or bushings on one end of an axle require replacement, then the cam shaft and/or bushings on the other end of the same axle should also be replaced, and all other axles of the vehicle should be inspected for the same worn condition.

There are two primary contributors to cam shaft and bushing wear, namely, load-induced wear and contamination-induced wear. Wear due to loading is encountered in two different conditions that can be defined as quasi-static and dynamic. The quasi-static case occurs when the vehicle brakes are applied and braking forces are reacted in the cam shaft bushings. This scenario is considered quasi-static due to the relatively low rotational speed of the cam shaft and the steady state condition when the brakes are held at constant pressure. In such a case, the loads on the outboard bushing are greater than on the inboard bushing. The dynamic load case typically occurs when the brakes are in the released condition and the cam shaft experiences vibrations due to road inputs. These vibrations result in impact loading of the cam shaft against the bushings.

Cam shaft and bushing wear due to contamination is caused primarily by environmental factors. Seals generally are disposed on each end of each bushing to capture the lubricant inside the bushings as well as to prevent ingress of contaminants from the outside environment. The lubricant not only acts to reduce friction between the cam shaft and the bushings, but also suspends any contaminants that may migrate past the seals and into the bushing. The lubricant also acts as a barrier to moisture that could cause corrosion of the cam shaft.

Thus, various types of cam shaft enclosure and/or support assemblies have been utilized in the brake system art to protect and support the cam shaft and ensure coaxiality of the bushings to prevent excessive rotational friction or binding of the cam shaft against one or more of the bushings when the brakes are actuated. Maintaining coaxiality of the bushings also improves the load support of the bushings. More particularly, loads are more evenly distributed across the surfaces of both bushings and there is a reduced chance of the cam shaft contacting a small area or edge of one of the bushings. Such support increases the load-bearing area available for the cam shaft, thus reducing bushing wear due to quasi-static and dynamic load conditions. Such a cam support/enclosure assembly also protects the bushings from environmental contamination. The cam tube eliminates two seals over bushings used without a cam tube, and reduces by two the number of locations for ingress of contaminants into the bushings. The cam tube also provides a larger grease reservoir to improve lubricity and to suspend any contaminants that may migrate past the seals.

However, prior art cam shaft support/enclosure assemblies typically have required a weld at the attachment point of the inboard end of the cam tube to the vehicle to react rotation of the tube induced by cam shaft rotation. Unfortunately, such a weld can be subject to fatigue and failure. Moreover, due to the requirement of such welding and/or shimming during installation of the cam tube support/enclosure assembly during production of an axle/suspension system, the cam assembly typically must be custom fit to a single type of axle/suspension system. More specifically, different axle/suspension systems have different distances between the two major support points for the cam assembly, namely, the brake system spider and the beam of the axle/suspension system. Thus, one size of cam assembly with fixed weld points will fail to fit many axle/suspension systems. In addition, custom-fitting also is required on same-type axle/suspension systems due to small tolerances in the distance between the support points for the cam tube caused by natural variations in manufacturing processes.

The present invention solves the above-described problems of fatigue failure and custom-fitting by utilizing an inboard cam tube support plate having a predetermined keyhole configuration that matches the configuration of the periphery of the inboard end of the cam tube. The support plate reacts cam tube rotation without the possibility of fatigue to and failure of a weld. The keyhole slip fit between the cam tube and support plate further enables installation of the cam tube on different types of axle suspension systems, where the distance between the brake spider and inboard suspension beam points of support for the cam tube varies, as well as on same-type suspension assemblies without concern for differing distances between the support points caused by natural variations in manufacturing processes.

SUMMARY OF INVENTION

Objectives of the present invention include providing a cam shaft support/enclosure assembly which can be mounted on various types of axle/suspension systems having differing distances between the brake system spider and the suspension assembly beam, without custom fitting the cam shaft assembly, as well as on same-type suspension assemblies where manufacturing tolerances create different distances between the support points for the cam assembly.

Another objective of the present invention includes providing such a cam shaft assembly which is free of welds intended to prevent cam tube rotation induced by loads placed on the axle/suspension system during operation of the vehicle, as well as from loads caused by operation of the brake system.

A further objective of the present invention is to provide such a cam shaft assembly which limits load-induced wear and contamination-induced wear to the cam shaft and bushings of the assembly.

A still further objective of the present invention is to provide such a cam shaft assembly which can be efficiently assembled in a production environment, which is durable in use and cost-effective to install and maintain.

These objectives and advantages are obtained by a cam shaft support and enclosure assembly for a vehicle, the assembly including, a cam tube having first and second ends, at least one of the ends being formed with engagement means, a pair of bushings, each one of the bushings being mounted in a respective one of the cam tube ends, a spider mounted on an axle of the vehicle, the spider receiving and supporting the cam tube first end, support means spaced from the spider for receiving and supporting the cam tube second end, a shaft having first and second ends, the shaft first end formed with a cam and the shaft second end formed with means for operatively engaging a slack adjuster, the shaft passing completely through the bushings and the cam tube so that the cam and the slack adjuster engagement means each extend outwardly from respective ones of the cam tube ends, the cam tube ends being sealed and the cam tube containing a lubricant, and at least one of the spider and the support means being formed with engagement means for mating with the cam tube engagement means, enabling the spider and the support means to react loads emanating from the cam tube.

BRIEF DESCRIPTION OF THE DRAWINGS

The preferred embodiment of the invention, illustrative of the best mode in which applicants have contemplated applying the principles, is set forth in the following description and is shown in the drawings and is particularly and distinctly pointed out and set forth in the appended claims.

Similar numerals refer to similar parts throughout the drawings.

DESCRIPTION OF THE PREFERRED EMBODIMENT

Figure 1:
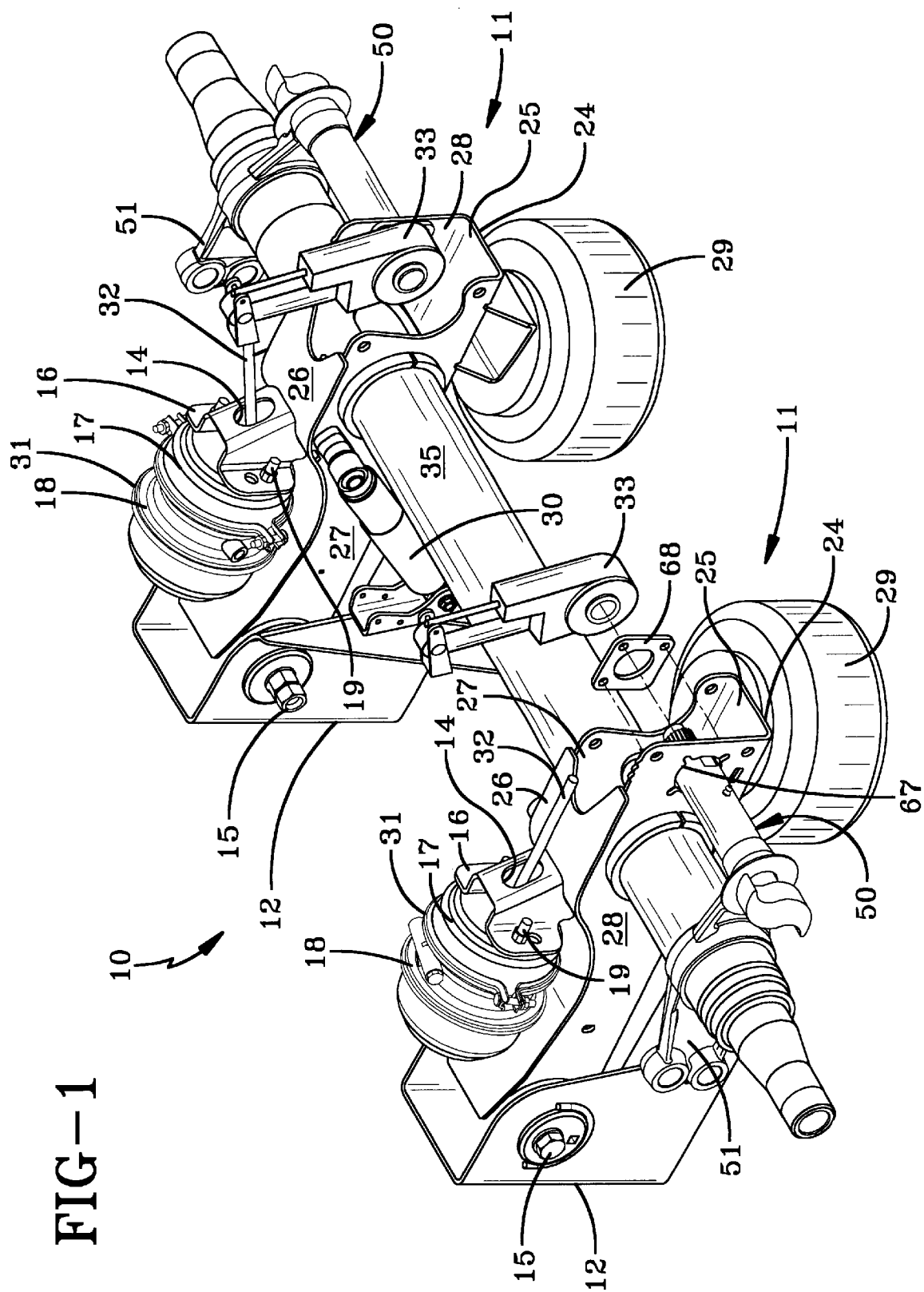
FIG. 1 is an inverted, partially exploded perspective view of an axle/suspension system of the type useful in a heavy duty vehicle such as the trailer of a semi-trailer, and showing the cam shaft support/enclosure assembly of the present invention mounted on each end of the system.

So that one representative environment in which the cam shaft support/enclosure assembly of the present invention operates, as well as the invention itself, both can be better understood, an air-ride beam-type trailing arm axle/suspension system for a tractor-trailer is indicated generally at 10 and is shown in FIG. 1. Inasmuch as axle/suspension system 10 includes generally identical suspension assemblies 11, each suspended from a respective one of a pair of hangers 12, only one of these suspension assemblies will be described herein. Hanger 12 is, by any suitable means, securely mounted on and depends from the underside of the trailer of a semi-trailer or from another heavy duty vehicle (not shown).

A bushing (not shown) is pivotally mounted on hanger 12 by any suitable means such as a fastener 15. The bushing preferably is of the type having multi-functional characteristics. More specifically, the multi-functional characteristics include required load and deflection ratios, or static rates, of varying levels in different directions for semi-trailer axle/suspension system applications. The bushing static rate is stiff in the horizontal radial direction, so that axle/suspension system 10 remains substantially perpendicular to the direction of movement of the semi-trailer despite horizontal loading which may be placed on the axle/suspension system, and relatively soft in the vertical radial direction, to enable the suspension system and bushing to absorb vertical loading shocks and provide a smooth ride for the vehicle occupants and any cargo carried by the vehicle.

The front end of a trailing arm or beam 24 in turn is rigidly attached to a mounting tube (not shown) containing the bushing by any suitable means such as welding. Beam 24 generally is rectangular-shaped and includes spaced-apart top and bottom walls 25 and 26, respectively, and spaced-apart inboard and outboard sidewalls 27 and 28, respectively. Top wall 25 is formed integrally with sidewalls 27, 28 to form an inverted generally U-shaped structure. Bottom wall 26 extends between, is welded to, and interconnects sidewalls 27, 28. An air spring 29 is suitably mounted on and extends between the upper surface of the rear end of top wall 25 and the underside of the vehicle. A shock absorber 30 extends between and is mounted on inboard sidewall 27 of suspension beam 24 and hanger 12.

A dual brake chamber 31 of the vehicle braking system is mounted on a bracket 16, which in turn is mounted on and depends from bottom wall 26 of suspension beam 24, by passage of a piston rod 32 of dual chamber 31 through an opening 14 formed in the bracket. Fasteners 19 formed integrally with a service brake chamber 17, are passed through openings (not shown) formed in bracket 16 to secure dual brake chamber 31 to the bracket. Dual brake chamber 31 includes service brake chamber 17 and a parking brake chamber 18. Brake chamber piston 32 in turn is pivotally attached to a slack adjuster 33.

An axle 35 extends between and is immovably captured in suspension beam 24 and its corresponding opposite suspension beam of axle/suspension system 10. A set of wheels/tires (not shown) is mounted on each end of axle 35.

Figure 2:
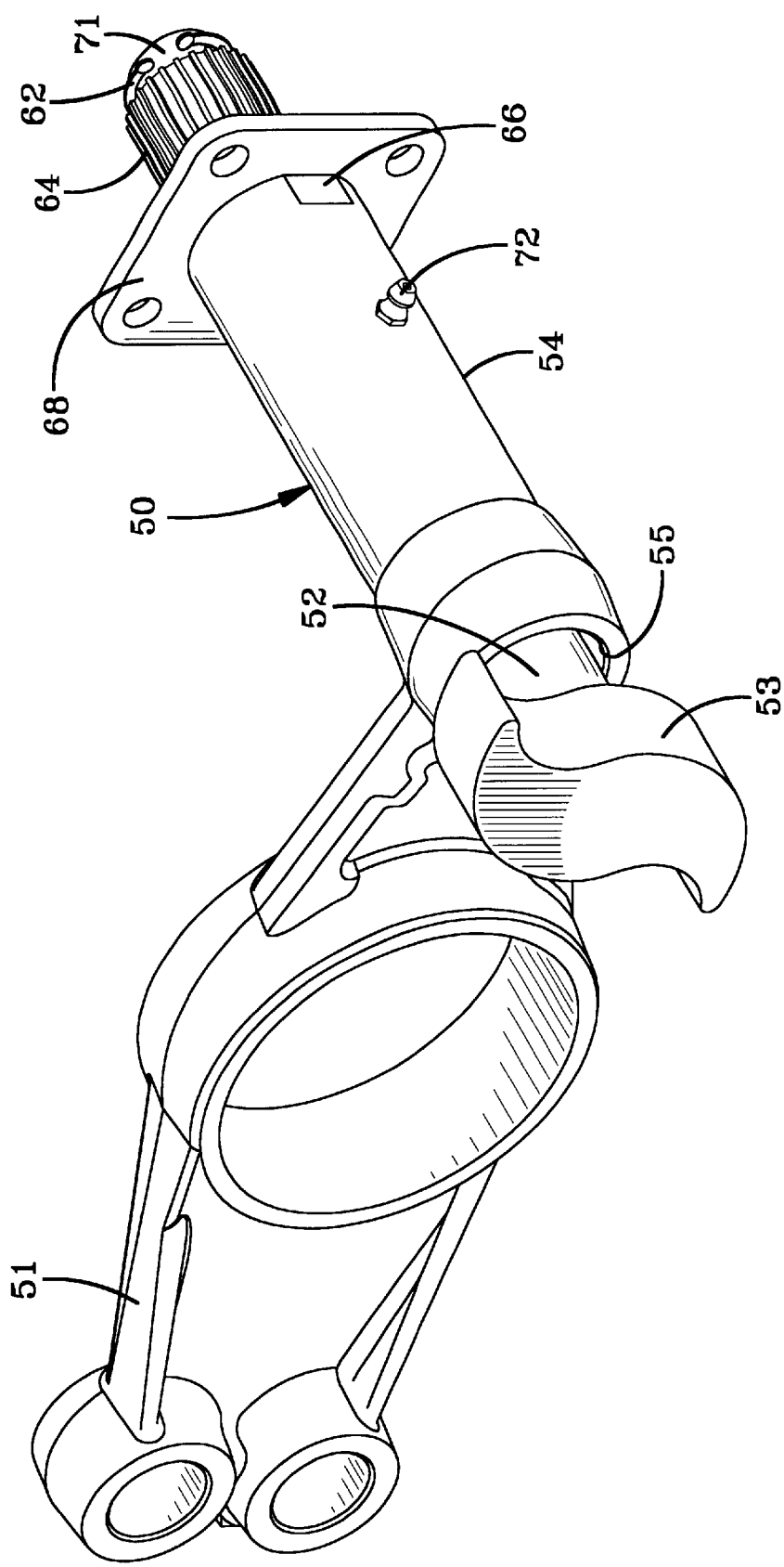
FIG. 2 is an enlarged perspective view of one of the cam shaft support/enclosure assemblies shown in FIG. 1.
Figure 3:
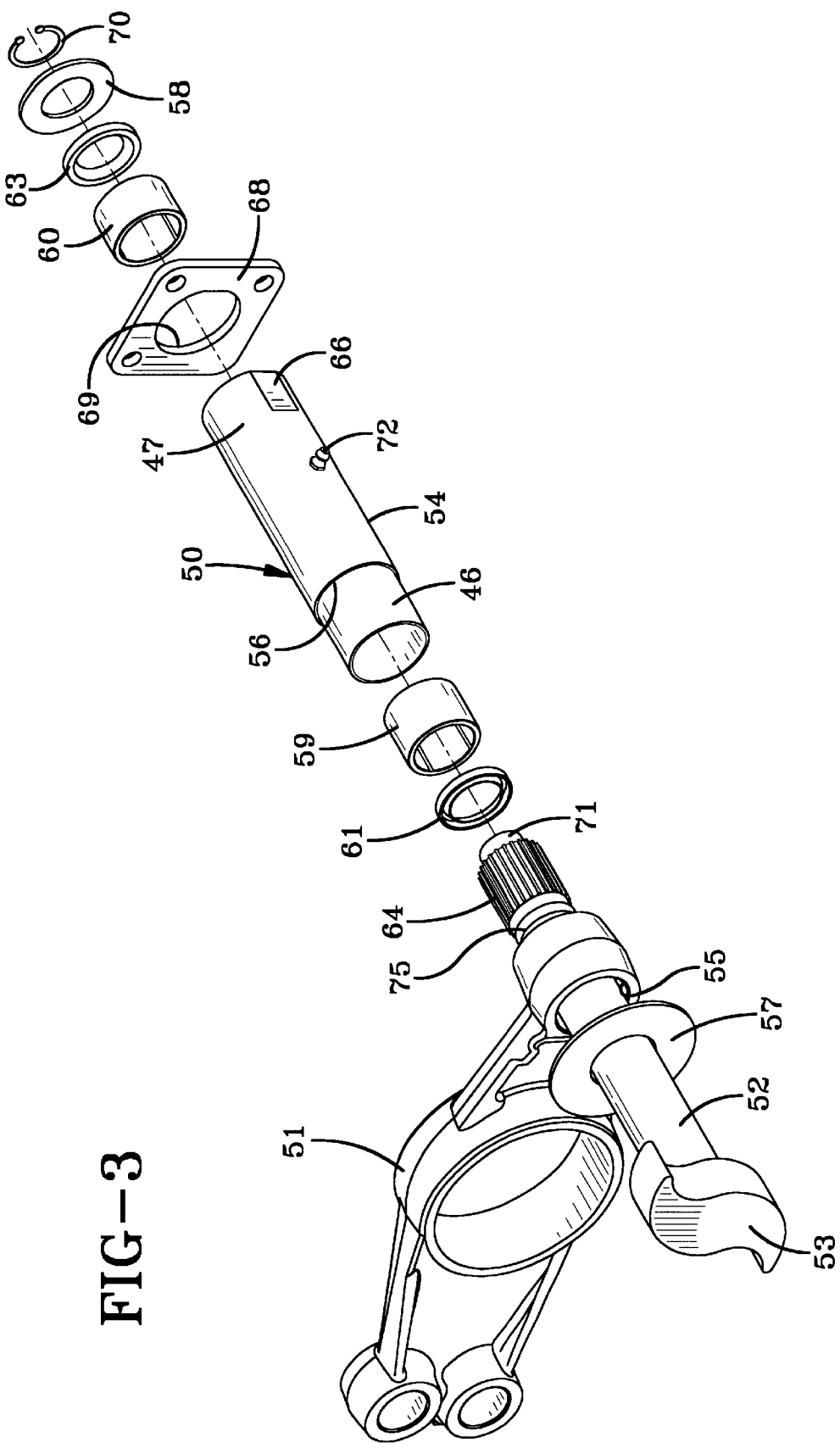
FIG. 3 is a reduced-size exploded view of the assembly shown in FIG. 2.
Figure 4:
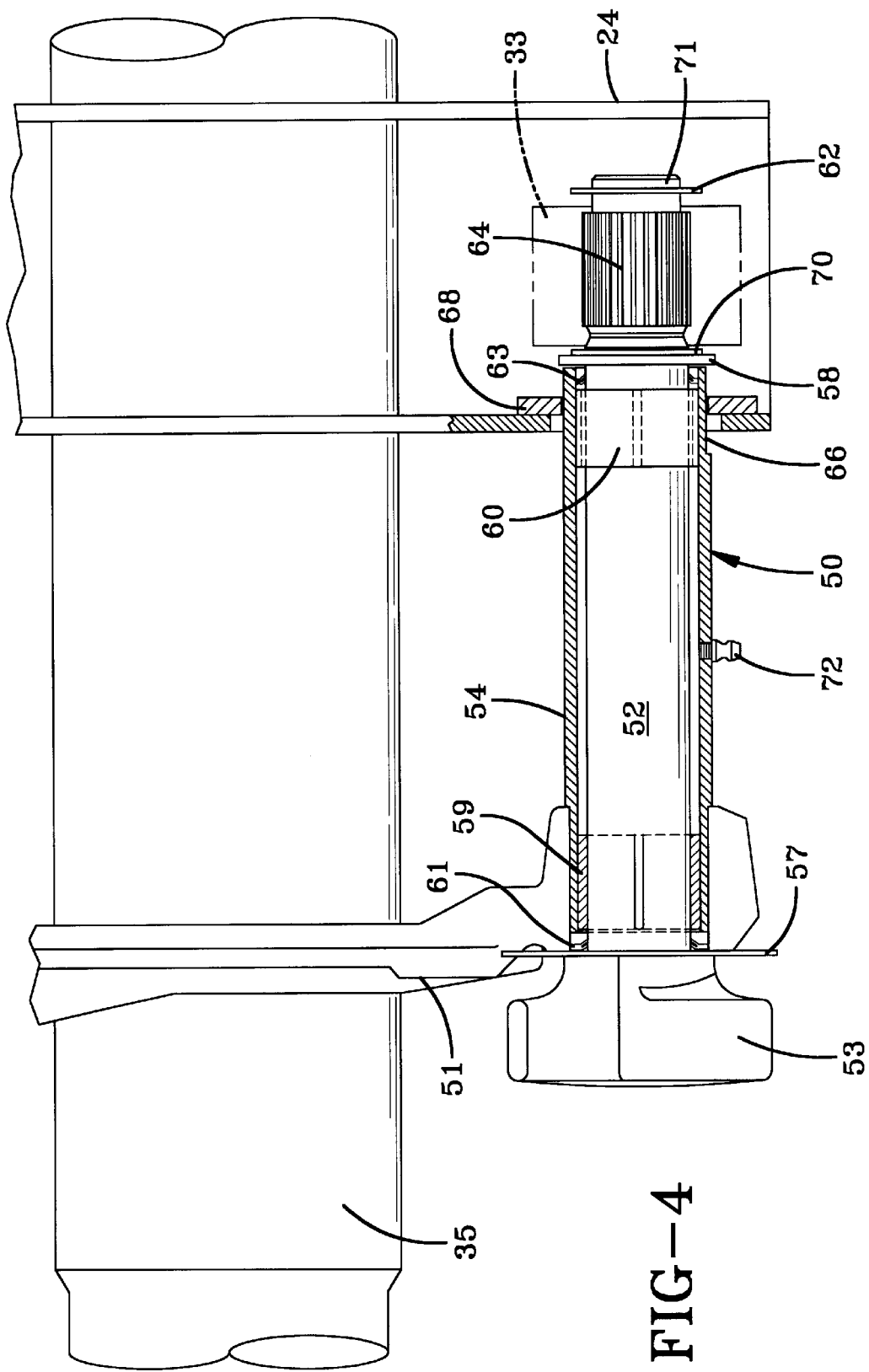
FIG. 4 is a fragmentary plan view, with portions broken away and shown in section and hidden portions shown in phantom lines, of the left-hand cam shaft support/enclosure assembly shown in FIG. 1, mounted on an axle and suspension beam of the axle/suspension system.
Figure 6:
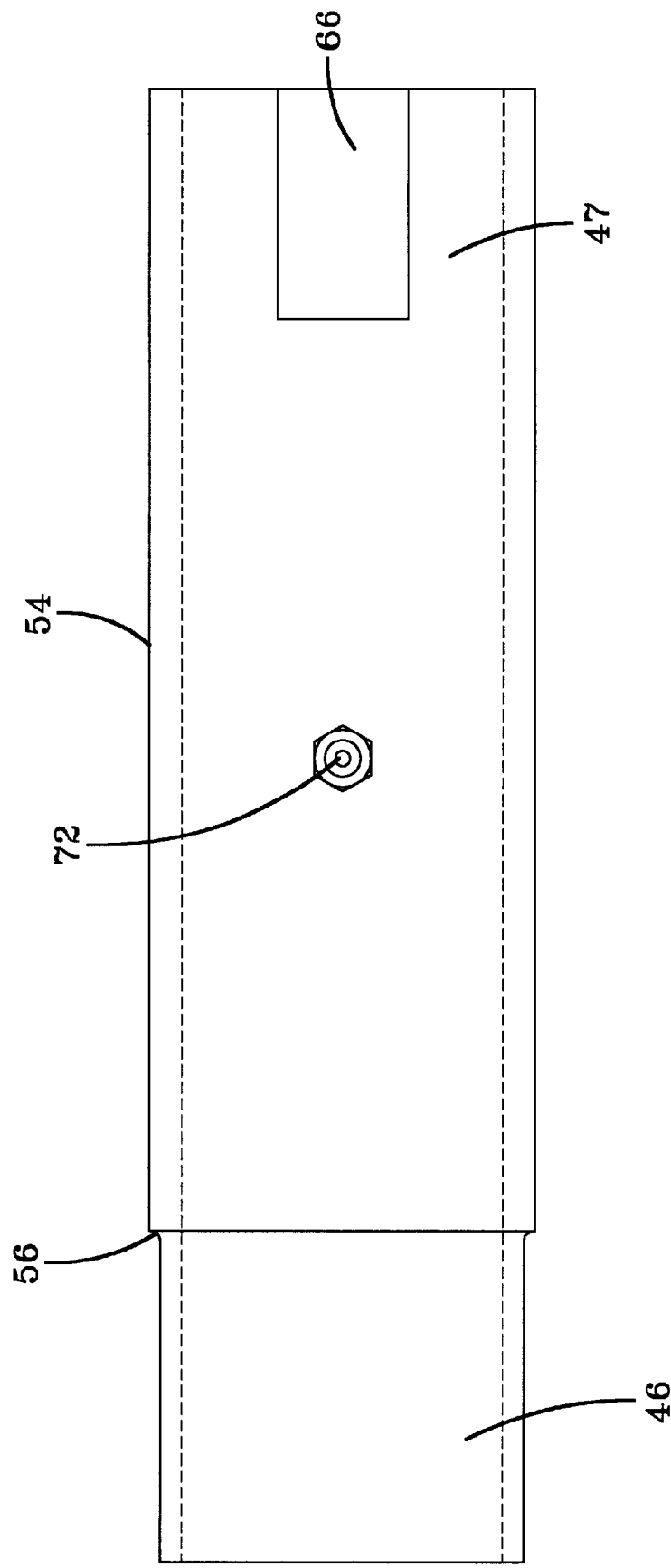
FIG. 6 is an elevational view, with portions shown in hidden lines, of the cam tube of the cam shaft support/enclosure assembly of the present invention.

Turning now to the present invention, a cam shaft support/enclosure assembly 50 is mounted on axle 35 and suspension beam 24 adjacent to each suspension assembly 11 (FIG. 1). Only one of the cam shaft support/enclosure assemblies 50 will be described hereinbelow, since the structure and operation of each of the assemblies is similar. More particularly, cam shaft support/enclosure assembly 50 includes a cam shaft 52 having an S-cam 53 immovably attached to the outboard end of the cam shaft. A spider 51 is immovably mounted by any suitable means, typically welds, on axle 35, and a cam tube 54 is mounted in a bore 55 formed in the cam assembly support end of the spider (FIGS. 2–4). More specifically, and as best shown in FIGS. 3, 4 and 6, a reduced diameter outboard end 46 of cam tube 54 forms a shoulder 56 in the periphery of the cam tube, whereby the cam tube outboard end is slip-fit in spider bore 55. Shoulder 56 acts as a stop to prevent outboard movement of seated cam tube 54. A sealant or adhesive is applied to the exterior of cam tube outboard end 46 and/or the interior surface of spider bore 55 to limit the ingress of contaminants and/or moisture into the inboard end of the spider bore, thereby aiding in preventing damage to the slip fit connection between cam tube 54 and spider 51, but also aiding in the prevention of entry of contaminants into the cam tube.

Outboard and inboard bushings 59 and 60, respectively, are friction-fit in cam tube outboard and inboard ends 46, 47 (FIGS. 3 and 4). An outboard seal 61 is friction-fit in spider bore 55 and is disposed adjacent to cam tube outboard end 46. An inboard seal 63 is friction-fit in cam tube inboard end 47 adjacent to the inboard end of bushing 60. Cam shaft 52 is rotatably mounted in and passes completely through outboard and inboard bushings 59, 60 and cam tube 54, so that S-cam 53 is exposed and is located adjacent to cam tube outboard end 46, and a splined inboard end 64 of cam shaft 52 is exposed and is located adjacent to cam tube inboard end 47. A washer 57 is captured about cam shaft 52 between S-cam 53 and spider 51 to prevent friction contact between the S-cam and the spider.

Figure 5:
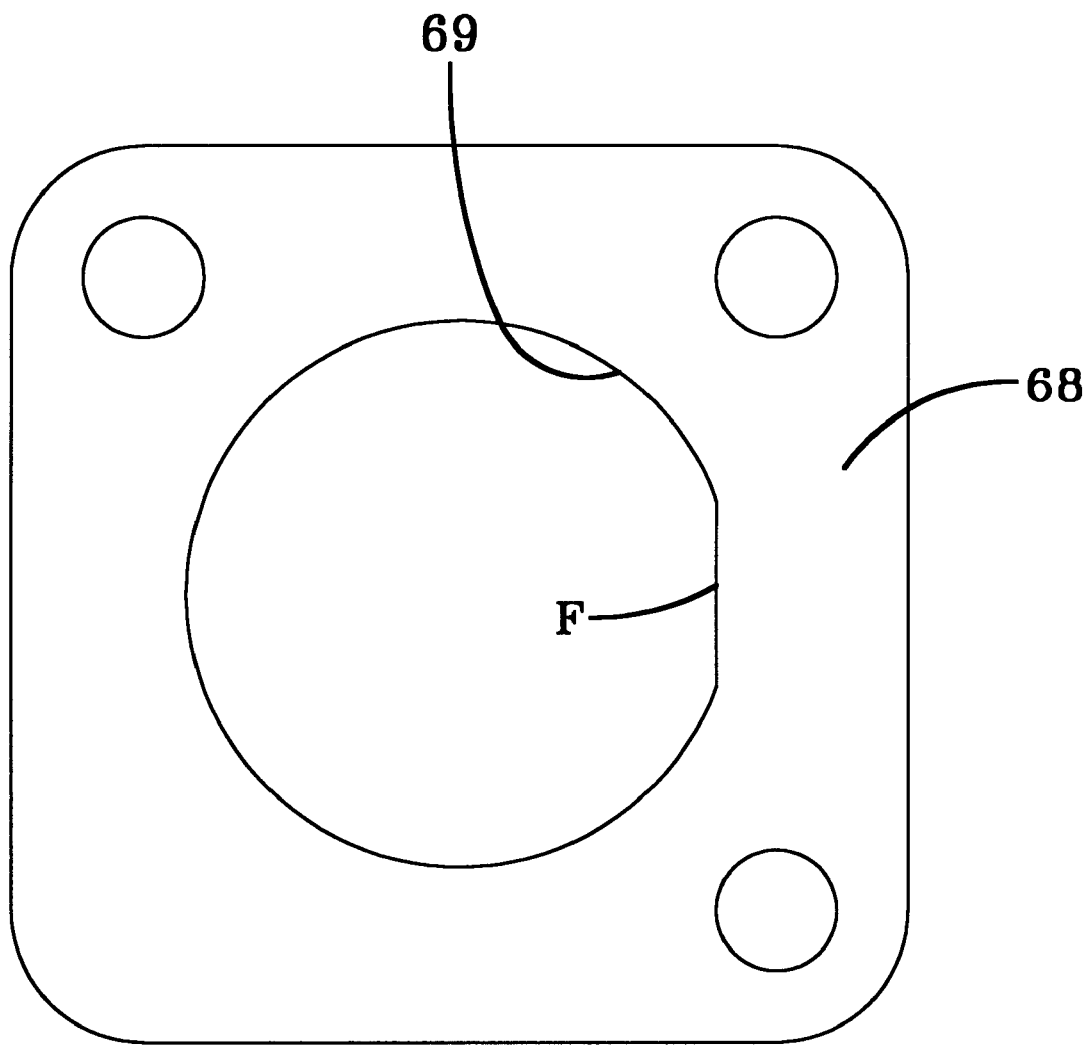
FIG. 5 is an elevational view of the suspension beam mounting plate of the cam shaft support/enclosure assembly.

In accordance with one of the key features of the present invention, inboard end 47 of generally cylindrical-shaped cam tube 54 is formed with a flat 66 (FIGS. 2–4 and 6). Cam tube inboard end 47 passes freely through an opening 67 (FIG. 1) formed in outboard wall 28 of suspension beam 24, and through an opening 69 formed in a support plate 68. More particularly, support plate 68 is attached to the inboard surface of beam outboard sidewall 28 by any suitable means such as a floating fastener joint. Plate 68 is formed with correspondingly sized and shaped opening 69 (FIG. 5) to slip fittingly receive cam tube inboard end 47 formed with flat 66. This keyhole or generally D-shaped opening 69 formed in mounting plate 68, and which corresponds to the profile of cam tube inboard end 47, is important for several reasons, which will be described in detail immediately below in the description of the operation of cam shaft support/enclosure assembly 50 of the present invention.

Splined inboard end 64 of cam shaft 52 is meshingly engaged with the splined interior surface (not shown) of slack adjuster 33, as is well known in the art and to the literature. Slack adjuster 33 provides for transfer of in-line loads from brake chamber piston 32 into a torsional load on cam shaft 52. A snap ring 62 is snappingly engaged in a groove (not shown) formed in a reduced diameter inboardmost end 71 of cam shaft 52. The location of snap ring 62 inboard relative to slack adjuster 33, limits inboard axial movement of the slack adjuster and disengagement from cam shaft 52. Similarly, a washer 58 is captured about cam shaft 52 between cam tube inboard end 47 and slack adjuster 33. A snap ring 70 is snappingly engaged in a groove 75 formed in cam shaft 52 inboard from and adjacent to cam shaft splined inboard end 64. The combination of parts of washer 58 and snap ring 70 prevents cam shaft 52 from moving in an outboard direction any appreciable distance, but also reduces the play of the cam shaft within cam tube 54, which results in improved life of seals 61, 63. Finally, the combination of washer 58 and snap ring 70 also prevents appreciable inboard movement of cam tube 54.

A fitting 72 is mounted in an opening (not shown) formed in cam tube 54 to enable introduction of a lubricant such as heavy grease into the interior of the cam tube for lubricating cam shaft 52 and bushings 59, 60.

One of the main advantages of the present invention is that the improved cam shaft support/enclosure assembly 50 can improve brake component life, and in particular the life of seals 61, 63, bushings 59, 60 and cam shaft 52. Specifically, and as discussed hereinabove, there are two primary contributors to cam shaft and bushing wear, namely, load-induced wear and contamination-induced wear. Load-induced wear is caused by quasi-static and dynamic conditions. In the quasi-static case, when the vehicle brakes are applied braking forces are reacted in bushings 59, 60. This case is considered quasi-static due to the relatively low rotational speed of cam shaft 52 and the steady state condition when the brakes are held at constant pressure. In this quasi-static state, the load is greater on outboard bushing 59 than on inboard bushing 60. The dynamic load case typically develops when the brakes are in the released condition and cam shaft 52 experiences vibrations due to road inputs. This results in impact loading of cam shaft 52 against bushings 59, 60.

However, use of cam tube 54 in cam shaft support and enclosure assembly 50 of the present invention maintains bushings 59, 60 in coaxial relationship to effectively prevent excessive quasi-static and dynamic loads on the bushings. More particularly, this arrangement of parts prevents excessive rotational friction or binding of cam shaft 52 against one or more of bushings 59, 60, during brake actuation, and also improves the load support of the bushings. That is, loads are more evenly distributed across the surfaces of both bushings 59,60 and there is a reduced chance of cam shaft 52 contacting a small area or edge of one of the bushings. The load-bearing area also is increased for cam shaft 52 which also contributes to reduced wear of bushings 59,60. Moreover, use of cam tube 54 eliminates two seal interfaces and reduces by two the possible points of ingress of contamination into cam tube 54 as compared to bushings used without a tube. Cam tube 54 also provides a larger grease reservoir to assist in trapping and diluting any contaminants that may migrate past the seals.

In accordance with one of the key features of the present invention, support plate 68 formed with D-shaped opening 69 provides a means of reacting rotation of cam tube 54 induced by rotation of cam shaft 52. More specifically, flat 66 formed in cam tube 54 engages the flat portion F (FIG. 5) of support plate opening 69 and is large enough to react torsional loads imparted by the tube. In direct contrast, many prior art cam assembly designs weld the cantilevered cam tube to a suspension beam support plate, and such welds are susceptible to fatigue and failure due to the many loads reacted by the plate. The present invention eliminates the possibility of weld fatigue or failure since it is free of welds. Moreover, the slip fit, non-welded connection of support plate 68 and cam tube 54 is easy to assemble in a production environment. In addition, flat 66 is long enough horizontally to engage support plate 68. More specifically, cam tube 54 can be positioned in an inboard or an outboard direction a distance equal to the length of the flat 66, to account for manufacturing variances in the distance between the two main support points for the tube, namely spider 51 and suspension beam outboard wall 28. Thus, custom welding or shimming is not required during assembly of cam assembly 50 to account for such variances. This arrangement of parts also enables a single type of cam assembly 50 to be mounted on various types of axle/suspension systems having differing distances between the spider and beam, without custom fitting. In contrast, prior art cam shaft support and enclosure assemblies would have to be custom fit to account for such manufacturing variances and different axle/suspension systems, such as by changing the length of tube 54.

The slip fit of cam tube 54 and support plate 68 also accommodates possible dynamic small scale axial displacements of tube 54 relative to beam 24, which is possible due to the lack of welds. These displacements are caused by dynamic displacements between spider 51 and beam 24 due to deflections of axle 35. Also, since inboard seal 63 and cam shaft 52 remain static while moving with tube 54, seal life is improved and therefore the life of bushings 59,60 and cam shaft 52 also are improved. Also, the arrangement of washer 58 and snap rings 70 and 62 allows replacement of slack adjuster 33 without disturbing the other components of cam shaft support/enclosure assembly 50.

It is understood that other shapes of support plate opening 69 and the corresponding shape of cam tube inboard end 47 engaging that plate can be utilized without affecting the overall concept of the present invention. It is also understood that plate 69 could be welded directly to axle 35 or mounted on a separate bracket that is in turn welded to the axle. Moreover, it is contemplated that plate 69 could be eliminated altogether, and keyhole opening 69 could be formed directly in outboard sidewall 28 of beam 24. It is even contemplated that fitting 72 could serve the same purpose as flat 66. It is also within the scope of the present invention to create a friction fit between cam tube 54 and plate 69. In addition, D-shaped or other keyhole-shaped opening 69 could be formed in spider bore 55, and flat 66 or other keyhole-engaging member could be formed in or on outboard end 46 of cam tube 54. Finally, it should be appreciated that cam assembly 50 could be used on all types of heavy duty vehicles as well as on other types of brake systems, such as a system where spider 51 extends frontwardly, without affecting the overall concept of the present invention.

Accordingly, the improved cam shaft support and enclosure assembly is simplified, provides an effective, safe, inexpensive, and efficient assembly which achieves all the enumerated objectives, provides for eliminating difficulties encountered with prior cam shaft support and enclosure assemblies, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved cam shaft support and enclosure assembly is constructed, arranged and used, the characteristics of the construction and arrangement, and the advantageous, new and useful results obtained; the new and useful structures, devices, elements, arrangements, parts and combinations are set forth in the appended claims.

What is claimed is:

1. A cam shaft support and enclosure assembly for a vehicle, said assembly including:
   (a) a cam tube having first and second ends, at least one of said ends being formed with engagement means;
   (b) a pair of bushings, each one of said bushings being mounted in a respective one of said cam tube ends;
   (c) a spider adapted to be mounted on an axle of said vehicle, said spider receiving and supporting said cam tube first end;
      support means spaced from said spider for receiving and supporting said cam tube second end;
   (d) a shaft having first and second ends, said shaft first end formed with a cam and said shaft second end formed with means for operatively engaging a slack adjuster, said shaft passing completely through said bushings and said cam tube so that said cam and said slack adjuster engagement means each extend outwardly from respective ones of said cam tube ends, the cam tube ends being sealed and said cam tube containing a lubricant; and
   (e) at least one of said spider and said support means being formed with engagement means for mating with said cam tube engagement means, enabling the spider and the support means to react loads emanating from said cam tube.

2. The cam shaft support and enclosure assembly of claim 1, in which said cam tube engagement means enables said cam tube to be adjustable in an outboard and an inboard direction during assembling of said assembly to enable installation of the assembly on same-type and different-type axle/suspension systems having varying distances between said spider and said support means.

3. The cam shaft support and enclosure assembly of claim 2, in which said cam tube engagement means is a flat formed in an outer surface of said cam tube second end; and in which said support means is formed with engagement means, said engagement means being an opening corresponding to the profile of the cam tube second end formed with said flat.

4. The cam shaft support and enclosure assembly of claim 3, in which said support means is a plate formed with a generally D-shaped opening; in which an opening is formed in an outboard sidewall of a suspension assembly beam; and in which said plate is mounted on said beam outboard sidewall so that said plate opening and said beam sidewall opening are aligned.

5. The cam shaft support and enclosure assembly of claim 4, in which said cam tube first end is an outboard end and the cam tube second end is an inboard end; and in which said shaft first end is an outboard end and the shaft second end is an inboard end.

6. The cam shaft support and enclosure assembly of claim 5, in which said spider is formed with a bore for slip-fittingly receiving and supporting said cam tube outboard end and for limiting outboard movement of the cam tube; and in which a sealant is interposed between an outer surface of said cam tube outboard end and an interior surface of said spider bore.

7. The cam shaft support and enclosure assembly of claim 6, in which a first snap ring is snappingly engaged on an inboard end of said shaft to limit inboard movement of said slack adjuster; in which a washer is captured about the shaft adjacent to said cam tube inboard end and outboard from the slack adjuster; and in which a second snap ring is snappingly engaged on said shaft adjacent to and inboard from said washer to limit inboard movement of said cam tube and outboard movement of said shaft.

8. The cam shaft support and enclosure assembly of claim 1, in which a fitting is mounted on an exterior surface of said cam tube and is aligned with an opening formed in the cam tube, to enable infusion of said lubricant into said sealed tube.

\* \* \* \* \*